(12) United States Patent
Bennett

(10) Patent No.: US 10,085,580 B2
(45) Date of Patent: Oct. 2, 2018

(54) METHOD OF SEAMING CARPET

(71) Applicant: Daniel Paul Bennett, Hopewell, VA (US)

(72) Inventor: Daniel Paul Bennett, Hopewell, VA (US)

( * ) Notice: Subject to any disclaimer, the term of this patent is extended or adjusted under 35 U.S.C. 154(b) by 275 days.

(21) Appl. No.: 15/250,467

(22) Filed: Aug. 29, 2016

(65) Prior Publication Data

US 2016/0374493 A1 Dec. 29, 2016

Related U.S. Application Data

(63) Continuation of application No. 14/616,194, filed on Feb. 6, 2015, which is a continuation-in-part of (Continued)

(51) Int. Cl.
*B29C 65/00* (2006.01)
*A47G 27/04* (2006.01)
(Continued)

(52) U.S. Cl.
CPC ....... *A47G 27/045* (2013.01); *A47G 27/0443* (2013.01); *B29C 65/4815* (2013.01); *B29C 65/5021* (2013.01); *B29C 65/5028* (2013.01); *B29C 65/5035* (2013.01); *B29C 65/5042* (2013.01); *B29C 66/1142* (2013.01); *B29C 66/232* (2013.01); *B29C 66/43* (2013.01); *B32B 5/024* (2013.01); *B32B 5/026* (2013.01); *B32B 5/04* (2013.01); *B32B 5/08* (2013.01); *B32B 5/26* (2013.01); *B32B 7/14* (2013.01); *C09J 7/0296* (2013.01); *C09J 7/043* (2013.01); *B29C 65/5007* (2013.01); *B29C 66/21* (2013.01); *B29L 2031/7652* (2013.01); *B32B 2262/062* (2013.01); *B32B 2307/51* (2013.01); *B32B 2471/02* (2013.01); *C09J 2201/28* (2013.01); *C09J 2201/36* (2013.01); *C09J 2201/61* (2013.01); *C09J 2203/314* (2013.01); *C09J 2400/263* (2013.01); *Y10T 428/24843* (2015.01); *Y10T 428/24851* (2015.01); *Y10T 428/2817* (2015.01); *Y10T 428/2826* (2015.01); *Y10T 428/2848* (2015.01); *Y10T 442/2098* (2015.04); *Y10T 442/277* (2015.04); *Y10T 442/2746* (2015.04)

(58) Field of Classification Search
CPC . B29C 66/43; B29C 66/1142; B29C 65/5042; B29C 65/5007; C09J 2203/314
USPC ... 156/304.3, 304.4, 304.6, 304.7, 163, 164, 156/229
See application file for complete search history.

(56) References Cited

U.S. PATENT DOCUMENTS 2,487,060 A 11/1949 Pike
2,647,850 A 8/1953 Reinhard
(Continued)

*Primary Examiner* — Mark A Osele
*Assistant Examiner* — Nickolas R Harm
(74) *Attorney, Agent, or Firm* — Patent Law of Virginia, PLLC; Brian J. Teague

(57) ABSTRACT

A method for joining two carpet segments, each carpet segment having an underside and at least one edge, comprises abutting one edge of one carpet segment with one edge of the other carpet segment, positioning a length of seam tape under the abutting edges, and activating the adhesive to secure the seam tape to the undersides of both carpet segments. The seam tape comprises an elongated base layer being resilient in a transverse direction, an intervening layer applied to the base layer, and an adhesive applied to the intervening layer.

11 Claims, 4 Drawing Sheets

Related U.S. Application Data application No. 13/626,986, filed on Sep. 26, 2012, now Pat. No. 8,980,042.

(51) Int. Cl.

| | | |
|---|---|---|
| B29C 65/48 | (2006.01) |
| B29C 65/50 | (2006.01) |
| B32B 7/14 | (2006.01) |
| C09J 7/04 | (2006.01) |
| C09J 7/02 | (2006.01) |
| B32B 5/02 | (2006.01) |
| B32B 5/04 | (2006.01) |
| B32B 5/08 | (2006.01) |
| B32B 5/26 | (2006.01) |
| B29L 31/00 | (2006.01) |

(56) References Cited

U.S. PATENT DOCUMENTS

| | | |
|---|---|---|
| 2,727,295 A | 4/1955 | Wright |
| 3,533,876 A | 10/1970 | Burgess |
| 3,618,754 A | 11/1971 | Hoey |
| 3,969,564 A | 7/1976 | Carder |
| 3,972,768 A | 8/1976 | Hill |
| 4,025,153 A | 5/1977 | Rodenbaugh |
| 4,132,582 A | 1/1979 | Winkler |
| 4,416,713 A | 11/1983 | Brooks |
| 4,438,323 A | 3/1984 | Milnes |
| 4,483,896 A | 11/1984 | Gray et al. |
| 4,525,233 A | 6/1985 | Brooks |
| 4,536,244 A | 8/1985 | Greci et al. |
| 4,545,843 A | 10/1985 | Bray |
| 4,749,433 A | 6/1988 | Johnston et al. |
| 4,919,743 A | 4/1990 | Johnston et al. |
| 4,935,280 A | 6/1990 | Gangi |
| 5,006,582 A | 4/1991 | Mancinelli |
| 5,104,475 A | 4/1992 | Foster et al. |
| 5,198,300 A | 3/1993 | Matthews et al. |
| 5,254,407 A | 10/1993 | Sergerie et al. |
| 5,376,419 A | 12/1994 | Foster et al. |
| 5,382,462 A | 1/1995 | Pacione |
| 5,384,001 A | 1/1995 | Hoopengardner |
| 5,411,781 A | 5/1995 | Sergerie et al. |
| 5,453,150 A | 9/1995 | Hoopengardner |
| 5,691,051 A | 11/1997 | Matthews |
| 5,824,175 A | 10/1998 | Hoopengardner |
| 6,066,227 A | 5/2000 | Melton et al. |
| 6,083,596 A | 7/2000 | Pacione |
| 6,110,565 A | 8/2000 | Matthews |
| 6,187,131 B1 | 2/2001 | Wenzel |
| 7,108,910 B1 | 9/2006 | Smith, Sr. et al. |
| 8,267,880 B2 | 9/2012 | Ritzdorf |
| 8,980,042 B2 | 3/2015 | Bennett |
| 2004/0055700 A1 | 3/2004 | Carroll |
| 2004/0068802 A1 | 4/2004 | Miller |
| 2007/0179418 A1 | 8/2007 | Ritzdorf |
| 2007/0238381 A1 | 10/2007 | Brewer et al. |
| 2008/0268734 A1 | 10/2008 | Tharpe |
| 2011/0214795 A1 | 9/2011 | Despins |
| 2015/0150400 A1 | 6/2015 | Bennett |

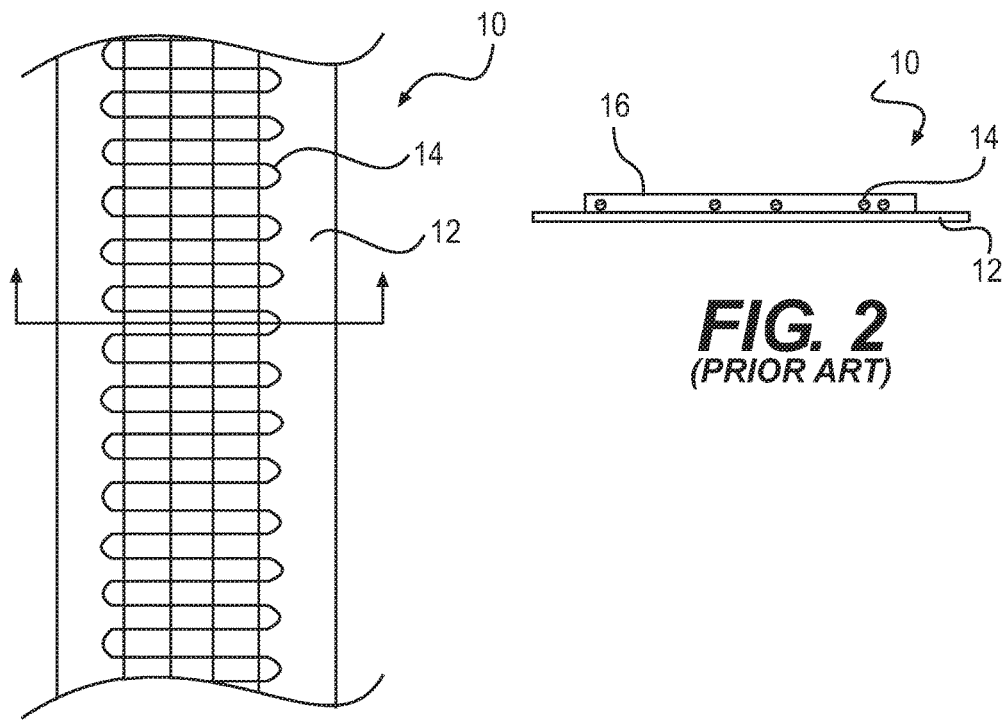
FIG. 1
(PRIOR ART)
FIG. 2
(PRIOR ART)
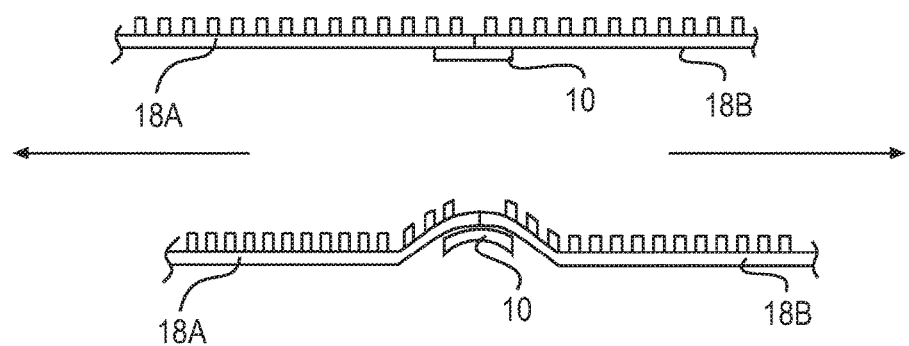
FIG. 3
(PRIOR ART)

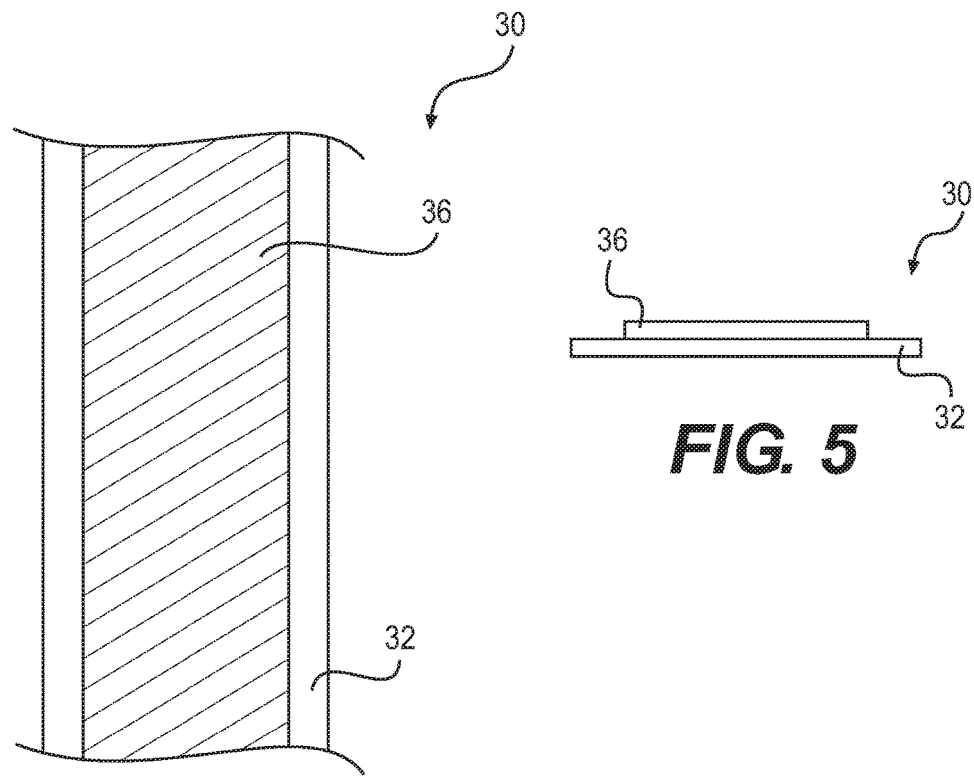
FIG. 4
FIG. 5
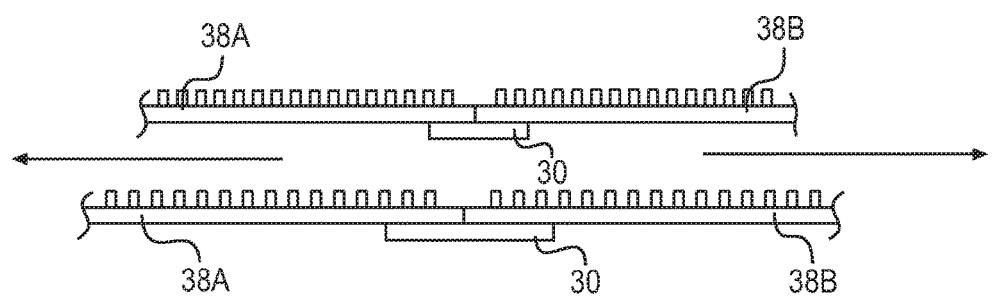
FIG. 6

METHOD OF SEAMING CARPET

CROSS-REFERENCE TO RELATED APPLICATIONS

This application is a continuation of co-pending U.S. application Ser. No. 14/616,194, filed Feb. 6, 2015, which in turn is a continuation-in-part of and claims priority to U.S. application Ser. No. 13/626,986, filed Sep. 26, 2012 and issued Mar. 17, 2015 as U.S. Pat. No. 8,980,042, the contents of which are incorporated herein by reference in their entirety.

FIELD OF THE INVENTION

The present invention relates to carpet seam tape and methods for joining carpet.

BACKGROUND

When installing carpet, it is common for the room in which the carpet is being installed to have at least one dimension (length or width) that is greater than the length of a standard roll of carpet (which is typically twelve feet). In such a case, a single unitary segment of carpet from a roll cannot cover the entire floor of the room, and two or more segments must be pieced together. When two or more segments are pieced together, an edge of one segment is abutted against an edge of another segment, and these edges are joined ("seamed") together using seam tape.

FIGS. 1 and 2 illustrate top and cross-sectional views, respectively, of prior art seam tape. Prior art seam tape 10 comprises an elongated base layer 12, scrim 14, and an adhesive 16 (the adhesive is omitted from FIG. 1 for clarity). The base layer typically comprises paper or other relatively inelastic material. The scrim typically comprises woven threads and provides strength and additional inelasticity to the seam tape. The adhesive typically comprises a hot-melt thermoplastic adhesive applied to a large portion of the base layer. The scrim is embedded within the adhesive.

When joining carpet edges together, the edge of one carpet segment is positioned to abut the edge of the other carpet segment. The seam tape is positioned under the abutting edges, and the adhesive is activated by applying heat to the top surface of the carpet above the seam tape. The heat melts the adhesive and the melted adhesive bonds to the underside of both carpet segments as the adhesive cures.

After the carpet segments are positioned to cover the entire floor and the seams are joined using seam tape, the carpet is stretched at the outer edges and the outer edges are secured to the floor using tack strips. The stretching tightens the carpet to remove any slack and wrinkles. FIG. 3 illustrates what happens when the carpet is stretched in a direction transverse to the carpet seam (indicated by the arrows in FIG. 3). The top image of FIG. 3 illustrates the unstretched carpet. As the carpet is stretched and the two carpet segments 18A, 18B are pulled away from each other, the inelasticity of the seam tape 10 causes the seam to lift off the floor, resulting in an unsightly bulge in the carpet (illustrated in the bottom image of FIG. 3). This is called seam "peaking" or "profiling" and is highly undesirable.

BRIEF SUMMARY

In one embodiment of the invention, a method for joining two carpet segments, each carpet segment having an underside and at least one edge, comprises abutting one edge of one carpet segment with one edge of the other carpet segment, positioning a length of seam tape under the abutting edges, and activating the adhesive to secure the seam tape to the undersides of both carpet segments. The seam tape comprises an elongated base layer being resilient in a transverse direction, an intervening layer applied to the base layer, and an adhesive applied to the intervening layer.

The adhesive may comprise a hot-melt thermoplastic adhesive.

The base layer may comprise textile or fabric. The textile or fabric may comprise cotton and elastane. The textile or fabric may comprise denim and elastane.

The adhesive may comprise (a) a unitary mass of adhesive, (b) a plurality of beads of adhesive, or (c) a plurality of spots of adhesive.

The intervening layer may comprise (a) a unitary mass of intervening layer, (b) a plurality of beads of intervening layer, or (c) a plurality of spots of intervening layer.

The intervening layer may comprise a sealant to inhibit the adhesive from seeping into pores of the base layer.

The adhesive may comprise a first adhesive, and wherein the intervening layer comprises a second adhesive. The second adhesive may comprise a polymer adhesive.

The seam tape may not comprise a scrim.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a top view of prior art seam tape.

FIG. 2 is a cross-sectional view of the prior art seam tape of FIG. 1 along the indicated line.

FIG. 3 illustrates carpet segments joined using the prior art seam tape of FIG. 1.

FIG. 4 is a top view of seam tape, in accordance with an embodiment of the present invention.

FIG. 5 is a cross-sectional view of the seam tape of FIG. 4.

FIG. 6 illustrates carpet segments joined using the seam tape of FIG. 4.

DETAILED DESCRIPTION

Figure 7:
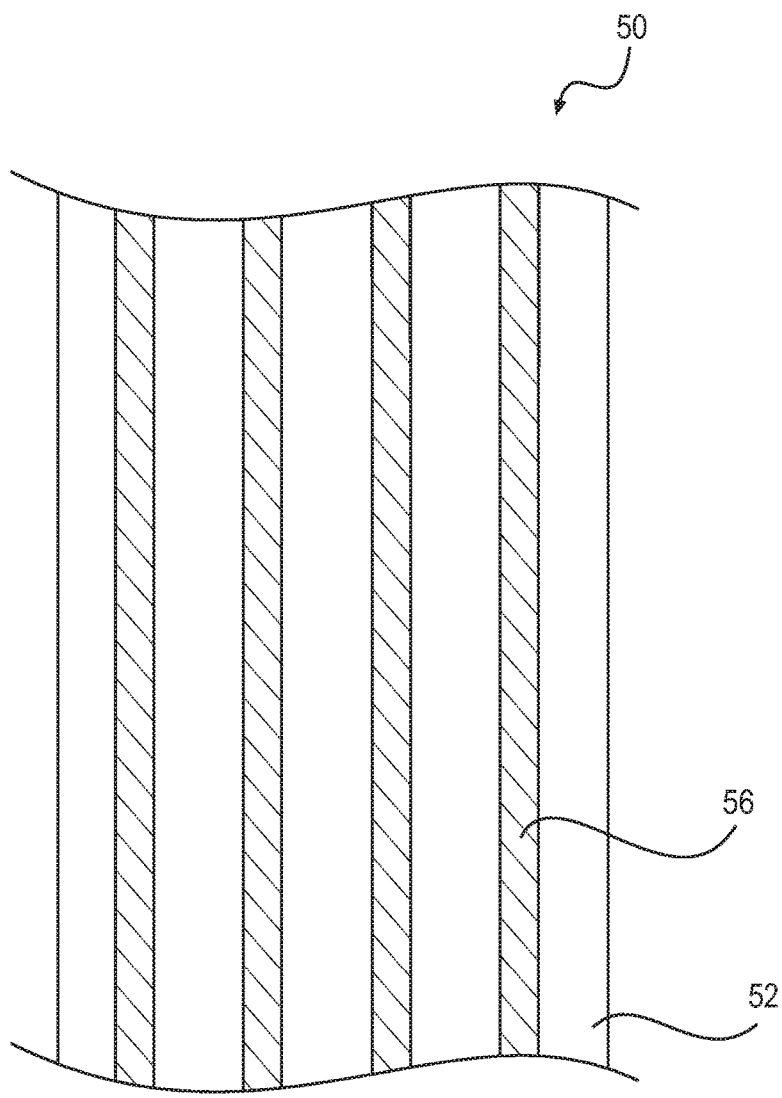
FIG. 7 is a top view of seam tape, in accordance with an alternative embodiment of the present invention.

Embodiments of the invention provide the ability to securely join carpet segments while preventing seam peaking when the joined carpet is stretched. Referring now to FIGS. 4 and 5, top and cross-sectional views are illustrated, respectively, of seam tape in accordance with an embodiment of the present invention. The seam tape 30 of embodiments of the invention comprises an elongated base layer 32 and an adhesive 36 applied to the base layer. Notably, the seam tape does not comprise a scrim. The elongated base layer may comprise any suitable material that is resilient (stretches and rebounds) in a transverse (perpendicular to the longitudinal axis) direction. For example, the elongated base layer may comprise a textile or fabric (including combinations of different textiles or fabrics), rubber, polymer (including combinations of different polymers), and combinations thereof. In one embodiment of the invention, the elongated base layer comprises a fabric that combines cotton (such as denim) and elastane (such as Lycra or Spandex). For example, the fabric that is used to make "stretch jeans" may be used for the base layer. Such a fabric may be, for example, 98% denim and 2% elastane or 95% denim and 5% elastane, although different amounts of denim and elastane may be used. Optionally, one or more additional materials may be combined with the cotton and elastane. For example, the elongated base layer may comprise a fabric that combines polyester with the cotton and elastane, such as a combination of 78% cotton denim, 18% polyester, and 4% elastane. The fabric may be dyed or undyed. The adhesive typically comprises a hot-melt thermoplastic adhesive.

The material selected for the elongated base layer should be as resilient as the carpet to which the seam tape is to be secured, such as to not impede the carpet from stretching. However, it may also be desirable for the material to not be significantly more resilient than the carpet. Such a material should provide enough stretch to the seam tape to reduce the likelihood of seam peaking, but not so much stretch as to allow a gap to be visible at the seam. As different types of carpets may have different amounts of resiliency, it may be desirable to have different types of seam tapes, each with a different amount of resiliency to match a different type of carpet. Alternatively, it may be desirable to have a single type of seam tape that has sufficient resiliency to be used with a wide variety of different types of carpet.

For purposes of this application, the terms "textile" and "fabric" are used interchangeably to refer to a flexible woven material comprising a network of natural or artificial fibers (often referred to as thread or yarn). Textiles are formed by weaving, knitting, crocheting, knotting, or pressing fibers together. For purposes of this application, the terms "textile" and "fabric" specifically exclude paper.

FIG. 6 illustrates what happens when carpet that is joined using carpet seam tape 30 of embodiments of the invention is stretched in a direction transverse to the carpet seam (indicated by the arrows in FIG. 6). As the two carpet segments 38A, 38B are pulled away from each other, the elasticity of the seam tape 30 prevents the seam from lifting off the floor, thereby preventing seam peaking. It does this by allowing the stretch to "reach" the seam. That is, the portions of the carpet that are affixed to the seam tape (of embodiments of the invention) are able to stretch (along with the seam tape). In contrast, the prior art seam tape does not allow the portions of the carpet that are affixed to the prior art seam tape to stretch (because the prior art seam tape does not stretch).

Figure 8:
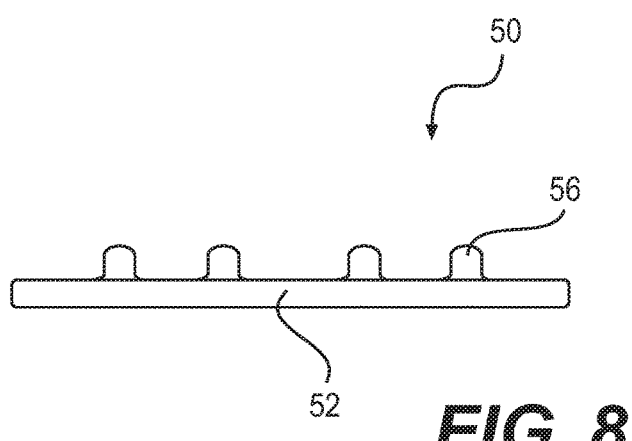
FIG. 8 is a cross-sectional view of the seam tape of FIG. 7.

Referring now to FIGS. 7 and 8, top and cross-sectional views are illustrated, respectively, of seam tape in accordance with an alternative embodiment of the present invention. The seam tape 50 of alternative embodiments of the invention comprises an elongated base layer 52 and an adhesive 56 applied to the base layer. As above, seam tape 50 does not comprise a scrim. Rather than a unitary mass of adhesive applied to the base layer, seam tape 50 comprises a plurality of "beads" of glue. The beads of glue are illustrated as being substantially parallel to the longitudinal axis of the seam tape and to each other, but other configurations may be used. The beads are illustrated as being continuous, but may be non-continuous beads or may even comprise individual "dots" or "spots" of adhesive. Such a non-unitary application of adhesive to the base layer may be desirable where a non-flexible (or insufficiently flexible) adhesive is used. Some types of adhesives, once cured, may be less flexible than other types of adhesives. For example, high melt glue is less flexible, once cured, than low melt glue. Using a non-unitary application of adhesive to the base layer when a less flexible adhesive is used prevents (or at least reduces) the adhesive from restricting the tape (and therefore the carpet) from stretching.

While four beads of adhesive are illustrated in FIGS. 7 and 8, the amount of adhesive in each bead and the spacing and number of the beads may vary, depending on the type of adhesive, the type of carpet, etc. It is desirable that the amount of adhesive and the spacing of the beads be selected such that the beads remain separate and do not run together when the seam tape is heated and the adhesive is melted. Since the use of such beads is typically limited to glues that are relatively less flexible, ensuring that the beads remain separate after melting helps maintain the continued resiliency of the seam tape.

The carpet seam tape of embodiments of the invention offers many improvements over prior art seam tape. The carpet seam tape of embodiments of the invention lays flat despite stretching of the carpet because the elasticity of the seam tape allows the carpet to stretch. The carpet seam tape of embodiments of the invention is easier to manufacture and less expensive due at least to the lack of a scrim. The carpet seam tape of embodiments of the invention provides a bond that is better capable of withstanding repeated steam cleaning due to its use of fabric rather than paper as the base layer.

When the carpet seam tape of embodiments of the invention is used to seam carpet, the edges of the carpet should be "seam sealed" as per standard carpet seaming practices established by the Carpet and Rug Institute. This seam sealing step further reduces the likelihood of peaking. It is anticipated that all other standard seaming techniques will work when the carpet seam tape of embodiments of the invention is used to seam carpet, and therefore should be used.

In addition to joining carpet segments during installation of carpet, the carpet seam tape of embodiments of the invention may be used in a carpet mill to join the ends of carpet rolls to form larger carpet rolls.

Figure 9:
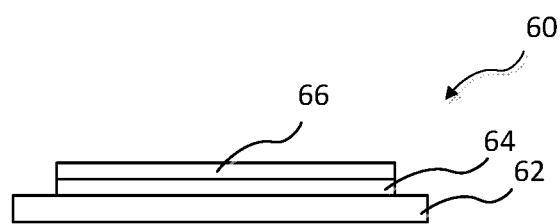
FIG. 9 is a cross-sectional view of seam tape, in accordance with an alternative embodiment of the present invention.

The adhesive may be applied directly to the base layer, as illustrated in FIGS. 4 and 5, or the adhesive may be applied indirectly to the base layer. Referring now to FIG. 9, a cross-sectional view of seam tape is illustrated in accordance with an alternative embodiment of the present invention. The carpet seam tape 60 of FIG. 9 comprises a base layer 62 (as described above), an intervening layer 64 applied to the base layer 62, and an adhesive 66 (as described above, which may be, for example, hot melt adhesive) applied to the intervening layer 64. In this regard, the adhesive is applied indirectly to the base layer.

As described above, the elongated base layer 62 may be resilient in a transverse direction and may comprise textile or fabric, such as (a) cotton and elastane or (b) denim and elastane.

The intervening layer may comprise a sealant to inhibit (partially or completely) the adhesive from seeping into pores or any similar openings in the base layer and/or melting through the base layer (which can happen with conventional seam tape if the seam tape is overheated during installation; if it happens, the seam tape may stick to the carpet padding, which is undesirable).

In one embodiment of the invention, the intervening layer comprises an adhesive (typically a different adhesive than the hot melt adhesive) which functions as a sealant. Specifically, the intervening layer may comprise a polymer adhesive such as Roberts® 8015 Universal Carpet Seam Sealer from Q.E.P. Co., Inc. The intervening layer may fully cover the base layer, or partly cover the base layer (such that part or parts of the base layer are not covered by the intervening layer). If the intervening layer partly covers the base layer, it may be applied as (a) a unitary mass of intervening layer (similar to the application of the adhesive in FIG. 4), (b) a plurality of beads of intervening layer (similar to the application of the adhesive in FIG. 7), or (c) a plurality of spots of intervening layer. The adhesive may fully cover the intervening layer, or partly cover the intervening layer. The adhesive may be applied as (a) a unitary mass, (b) a plurality of beads, or (c) a plurality of spots.

Using an intervening layer that inhibits the adhesive from seeping into pores or other openings of the base layer helps prevent the seam tape from sticking to the carpet padding, helps prevent the base layer from unraveling (particularly if the base layer is a fabric or textile), and helps keep the base layer resilient.

After the intervening layer is applied to the base layer, the intervening layer should typically be allowed to dry or cure (partially or fully) before the adhesive is applied to the intervening layer to help prevent the adhesive from combining with the intervening layer.

The embodiment of FIG. 9 may be used with a base layer that is not resilient in the transverse direction, or a base layer that is not resilient at all.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A method for joining two carpet segments, each carpet segment having an underside and at least one edge, the method comprising:
abutting one edge of one carpet segment with one edge of the other carpet segment;
positioning a length of seam tape under the abutting edges, the seam tape comprising:
an elongated base layer being resilient in a transverse direction;
an intervening layer applied to the base layer; and
an adhesive applied to the intervening layer; and
activating the adhesive to secure the seam tape to the undersides of both carpet segments.

2. The method of claim 1, wherein the adhesive comprises a hot-melt thermoplastic adhesive.

3. The method of claim 1, wherein the base layer comprises textile or fabric.

4. The method of claim 3, wherein the textile or fabric comprises cotton and elastane.

5. The method of claim 3, wherein the textile or fabric comprises denim and elastane.

6. The method of claim 1, wherein the adhesive comprises (a) a unitary mass of adhesive, (b) a plurality of beads of adhesive, or (c) a plurality of spots of adhesive.

7. The method of claim 1, wherein the intervening layer comprises (a) a unitary mass of intervening layer, (b) a plurality of beads of intervening layer, or (c) a plurality of spots of intervening layer.

8. The method of claim 1, wherein the intervening layer comprises a sealant to inhibit the adhesive from seeping into pores of the base layer.

9. The method of claim 1, wherein the adhesive comprises a first adhesive, and wherein the intervening layer comprises a second adhesive.

10. The method of claim 9, wherein the second adhesive comprises a polymer adhesive.

11. The method of claim 1, wherein the seam tape does not comprise a scrim.

* * * * *